(12) United States Patent
Pelloie et al.

(10) Patent No.: US 9,734,269 B2
(45) Date of Patent: Aug. 15, 2017

(54) LIBERTY FILE GENERATION

(71) Applicant: ARM Limited, Cambridge (GB)

(72) Inventors: Jean-Luc Pelloie, Grenoble (FR);
Kenza Charafeddine, Grenoble (FR)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/736,028

(22) Filed: Jun. 10, 2015

(65) Prior Publication Data
US 2016/0364517 A1    Dec. 15, 2016

(51) Int. Cl.
*G06F 17/50*    (2006.01)
*G06F 9/455*    (2006.01)

(52) U.S. Cl.
CPC ...... *G06F 17/5036* (2013.01); *G06F 17/5031* (2013.01); *G06F 2217/84* (2013.01)

(58) Field of Classification Search
CPC .................................................. G06F 17/5031
USPC ........................................................ 716/108
See application file for complete search history.

(56) References Cited

U.S. PATENT DOCUMENTS

| 2004/0025136 | A1* | 2/2004 | Carelli, Jr. | .......... | G06F 17/5036 716/102 |
| 2004/0122642 | A1* | 6/2004 | Scheffer | .............. | G06F 17/5022 703/14 |
| 2008/0133202 | A1* | 6/2008 | Tseng | .................. | G06F 17/5036 703/14 |
| 2011/0276933 | A1* | 11/2011 | Banerji | ............... | G06F 17/5031 716/108 |

* cited by examiner

*Primary Examiner* — Suresh Memula
(74) *Attorney, Agent, or Firm* — Pramudji Law Group PLLC; Ari Pramudji

(57) ABSTRACT

Various implementations described herein are directed to a system and methods for generating timing data for an integrated circuit. In one implementation, the method may include generating first timing data for the integrated circuit, and the first timing data may be related to one or more variations of operating conditions for the integrated circuit. Further, the method may include extracting parameter values from the first timing data in association with the one or more variations of operating conditions. Further, the method may include generating second timing data for the integrated circuit, and the second timing data may be based on the extracted parameter values.

20 Claims, 4 Drawing Sheets

LIBERTY FILE GENERATION

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Liberty (.lib) files gather data used by electronic design automation (EDA) tools to perform static timing analysis (STA) and power analysis of circuit blocks. Typically, for each variation in parameters settings, a liberty (.lib) file is generated. Unfortunately, this process can use significant amounts of computing resources and time.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations of a system and methods for generating liberty files will now be described in more detail herein with reference to FIGS. 1-4.

Figure 1:
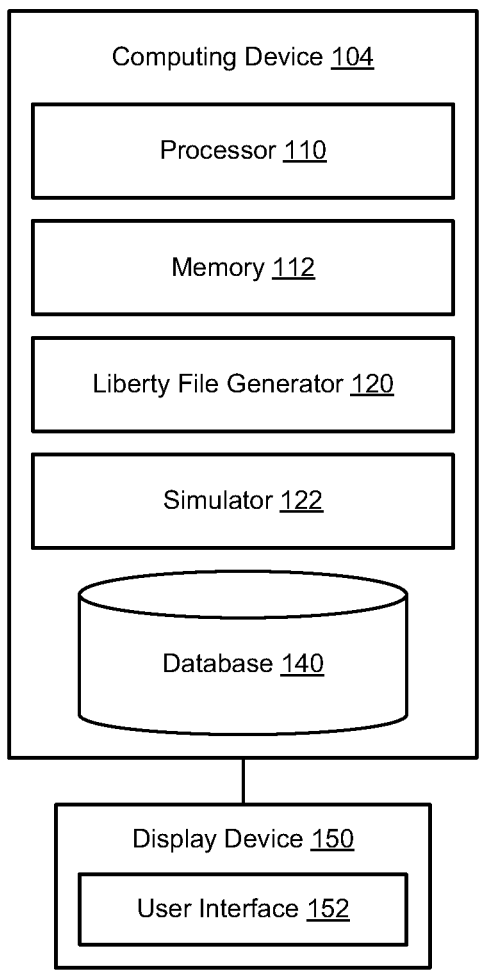
FIG. 1 illustrates a block diagram of a system for generating liberty files in accordance with various implementations described herein.

FIG. 1 illustrates a block diagram of a system 100 for generating liberty files in accordance with various implementations described herein.

Liberty files (.lib files) may refer to timing data for an integrated circuit. In some instances, liberty files may be used to provide timing and power parameters associated with one or more cells of an integrated circuit. The timing and power parameters may be generated from simulating cells of an integrated circuit under various operating conditions, and the data associated therewith may be represented in a .lib file format. Liberty files may include timing models and related data to calculate various timing characteristics and/or parameters associated with an integrated circuit, such as, e.g., input/output (I/O) delay paths, timing check values, interconnect delays, etc.

In reference to FIG. 1, the system 100 may include a computer based system configured to generate liberty files. The system 100 may be associated with a computing device 104 implemented as a special purpose machine configured to generate liberty files, as described herein. In this instance, the computing device 104 may include any standard element (s) and/or component(s), including at least one processor(s) 110, memory 112 (e.g., non-transitory computer-readable storage medium), one or more database(s) 140, power, peripherals, and various other computing elements and/or components that may not be specifically shown in FIG. 1. The computing device 104 may include instructions stored on the non-transitory computer-readable medium 112 that are executable by the at least one processor 110. The computing device 104 may be associated with a display device 150 (e.g., a monitor or other display) that may be used to provide a user interface (UI) 152, such as, e.g., a graphical user interface (GUI). In some instances, the UI 152 may be used to receive various parameters and/or preferences from a user for managing, operating, and/or utilizing the computing device 104. As such, the computing device 104 may include the display device 150 for providing output to a user, and the display device 150 may include the UI 152 for receiving input from the user.

In various implementations, the computing device 104 may be configured to implement a methodology for generating scaled liberty files from pre-characterized liberty files. For instance, liberty files (.lib files) may be used to gather data used by electronic design automation (EDA) tools to perform static timing analysis (STA) and power analysis of integrated circuits and circuit blocks. For each cell included in the .lib file, depending on its logic function, different data may be available, such as, e.g., one or more of input pin capacitance, propagation delay from input to output, output transition time, various timing constraints (e.g., hold/setup/min pulse width), current leakage power, and energy per transition. In some instances, a circuit path delay may result from addition of delays of cells being part of this path. In other instances, a circuit power may result from addition of power of cells being part of a circuit. The different data available in the .lib file may be a result from SPICE simulations (Simulation Program with Integrated Circuit Emphasis) performed at cell level. Running these SPICE simulations for the cells included in the .lib file may use significant CPU time. In some instances, a .lib file may be generated for one specific PVT (process/voltage/temperature) corner for one type of transistor (e.g., low-VT, high-VT, etc.). Designing an integrated circuit may use multiple .lib files to account for possible variations (process, voltage, temperature, etc.) for different transistor types. The number of .lib files may be consequently multiplied.

In accordance with various implementations described herein, the computing device 104 may be configured to implement a methodology to reduce a number of liberty files (.lib files) resulting from SPICE simulations to thus reduce processing resources and further, reduce time to generate .lib files. The methodology may be configured to generate .lib files for one or more different voltage and temperature values in reference to a specific process corner. Further, mathematical empirical equations (e.g., models) may be used to describe the variation of a data (e.g., input capacitance, delay, etc.) versus the voltage and the temperature. In some implementations, a variation of delay with voltage may be described with accuracy by the following equation:

$$Td = To + \frac{S}{V^n} \qquad \text{(Equation 1)}$$

where Td refers to delay, V refers to voltage, and To, S and n are constants that refer to various fitting parameters selected from timing data. The methodology is described further herein in reference to the method of FIG. 2.

In reference to FIG. 1, the computing device 104 may include a liberty file generator 120 configured to cause the at least one processor 110 to generate first timing data for an integrated circuit. The first timing data may be related to one or more variations of operating conditions for the integrated circuit. The one or more variations of operating conditions may include voltage variations and/or temperature variations. The first timing data may include data related to circuit path delay for circuit components of the integrated circuit. Further, the first timing data may include data related to circuit power for circuit components of the integrated circuit.

In some implementations, the liberty file generator 120 may be configured to cause the at least one processor 110 to generate one or more first liberty files for gathering the first timing data generated for the integrated circuit in association with the one or more variations of operating conditions. As described herein, the first liberty files may be used by electronic design automation (EDA) tools to perform static timing analysis (STA) and power analysis of the integrated circuit.

The liberty file generator 120 may be configured to cause the at least one processor 110 to extract one or more parameter values (e.g., To, S, and n for Equation 1) from the first timing data in association with the one or more variations of operating conditions. This may therefore substantiate use of a mathematical equation that may be used for data fitting. Thus, the liberty file generator 120 may be configured to cause the at least one processor 110 to derive an equation (e.g., mathematical fitting equation) that characterizes the first timing data generated for the integrated circuit in association with the one or more variations of operating conditions. In some instances, the liberty file generator 120 may be configured to extract the one or more parameter values from the first timing data based on the derived equation. Further, the liberty file generator 120 may be configured to generate the second timing data based on the derived equation and the extracted parameter values. Still further, the liberty file generator 120 may be configured to generate the one or more second liberty files (e.g., as described for gathering the second timing data generated for the integrated circuit) in association with the derived equation and the extracted parameter values.

In some implementations, extracting parameter values from the first timing data may include selecting parameter values for different variations of operating conditions in association with the one or more first liberty files. From the selected parameter values of the first timing data, extracting may include determining parameter values having an error between the first timing data and the one or more first liberty files within a pre-defined threshold value. Further, the parameter values determined to have the error within the pre-defined threshold value may be stored in memory.

Further, the liberty file generator 120 may be configured to cause the at least one processor 110 to generate second timing data for the integrated circuit. In some instances, the second timing data may be based on the one or more extracted parameter values. In some implementations, the liberty file generator 120 may be configured to cause the at least one processor 110 to generate one or more second liberty files for gathering the second timing data generated for the integrated circuit in association with the extracted parameter values. As with the first liberty files, the second liberty files may be used by EDA tools to perform STA and power analysis of the integrated circuit.

Further, in some implementations, when generating second timing data for the integrated circuit, the liberty file generator 120 may be configured to cause the at least one processor 110 to use one or more other variations of operating conditions (e.g., one or more different voltage and temperature variations) for the integrated circuit as inputs to the derived equation. In this instance, the liberty file generator 120 may be configured to select corresponding parameter values for one or more other variations (e.g., different variations) of operating conditions for the integrated circuit. Further, the liberty file generator 120 may be configured to calculate the second timing data based on the selected corresponding parameter values in association with the derived equation and the extracted parameter values. The liberty file generator 120 may be configured to store the calculated second timing data in the one or more second liberty files.

In reference to FIG. 1, the computing device 104 may include a simulator 122 configured to cause the at least one processor 110 to generate one or more simulations of the integrated circuit. In some instances, the simulator 122 may include a SPICE simulator configured to generate SPICE simulations of the integrated circuit. Generally, SPICE is an acronym for Simulation Program with Integrated Circuit Emphasis, which is an open source analog electronic circuit simulator. Further, SPICE is a general-purpose software program used by the semiconductor industry to check the integrity of integrated circuit designs and to predict the behavior of integrated circuit designs. Therefore, in some instances, the liberty file generator 120 may be configured to interface with the simulator 122 to generate first timing data based on one or more simulations (including, e.g., SPICE simulations) of the integrated circuit for a range of variations of operating conditions including a range of voltage variations and temperature variations.

In some implementation, the computing device 104 may include one or more databases 140 configured to store and/or record various information related to generating liberty files. For instance, the database(s) 140 may be configured to store information related to the integrated circuit and one or more of various timing data (including the first and second timing data), liberty files (e.g., the first and second liberty files), and equation related data (e.g., the fitting mathematical equation and data related thereto). Further, the database(s) 140 may be configured to store information related to the integrated circuit in reference to simulation data (including, e.g., SPICE simulation data).

Various implementations of methods and methodologies for generating liberty files will now be described in reference to FIGS. 2-4.

Figure 2:
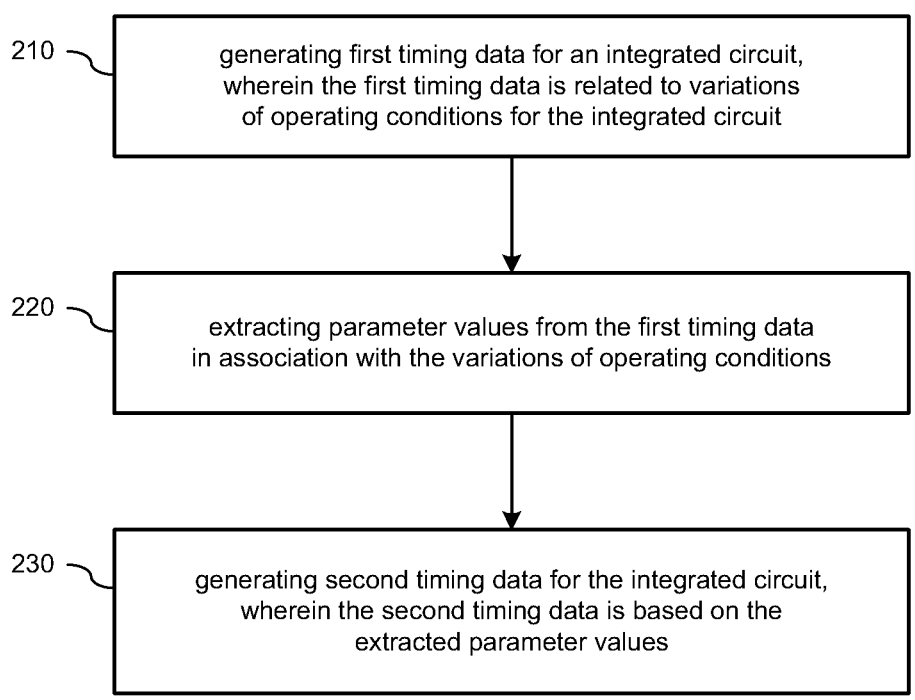
FIGS. 2-4 illustrate block diagrams of various methods for generating liberty files in accordance with various implementations described herein.

FIG. 2 illustrates a block diagram of a method 200 for generating liberty files in accordance with various implementations described herein. It should be understood that while method 200 indicates a particular order of execution of operations, in some instances, certain portions of the operations may be executed in a different order, and on different systems. Further, in some instances, the computing device 100 of FIG. 1 may be configured to perform method 200. In other instances, additional operations or steps may be added to method 200. Similarly, some operations or steps may be omitted.

In some implementations, method 200 may be implemented as a program or software instruction process configured for generating liberty files (.lib files). For instance, method 200 may be configured to provide the following sequence of events.

At block 210, method 200 may generate first timing data for an integrated circuit. The first timing data may be related to one or more variations of operating conditions for the integrated circuit, including voltage variations and/or temperature variations. The first timing data may include circuit path delay data and/or various other circuit related timing data for various circuit components of the integrated circuit. Further, the first timing data may include various circuit power data for various circuit components of the integrated circuit. In some instances, method 200 may generate the first timing data based on one or more simulations (e.g., one or more SPICE simulations) of the integrated circuit for a range of voltage variations and/or temperature variations. Further, at block 210, method 200 may generate one or more first liberty files (.lib files) for gathering the first timing data generated for the integrated circuit in association with variations of operating conditions, including voltage variations and/or temperature variations and/or a range of voltage and/or temperature variations. The first liberty files (.lib files) may include one or more timing models and/or various timing and power data that may be used to calculate I/O path delays, timing check values, interconnect delays, etc.

In some implementations, method 210 may generate a number (or set) of liberty files (.lib files) from SPICE simulations covering a range of voltage and/or temperature variations. For instance, temperature may vary (or may be varied) from −40° C. to 125° C., and voltage vary (or may be varied) from 0.7V to 1.0V. The number (or set) liberty files (.lib files) generated may be at least two (2), when the data varies linearly with voltage or temperature. The number liberty files (.lib files) generated may be at least three (3), when the data does not vary linearly with voltage or temperature. The number of liberty files (.lib files) generated may be increased depending on a desired accuracy. One specific example may use at least four (4) different voltage values (e.g., in situations when data does not vary linearly with voltage) and at least two (2) different temperature values, thus yielding a total number of eight (4×2=8) liberty files (.lib files) that may be generated from SPICE simulations for a specific process corner of an integrated circuit.

At block 220, method 200 may extract parameter values from the first timing data in association with one or more variations of operating conditions, including voltage and/or temperature variations. In some instances, method 200 may derive an equation (e.g., mathematical fitting equation) that characterizes the first timing data generated for the integrated circuit in association with the one or more variations of operating conditions, and in this instance, extracting parameter values from the first data may be based on the derived equation (e.g., mathematical fitting equation).

In some implementations, from the number (or set) of generated liberty files (.lib files), method 200 may extract parameter values for each data, fitting with a desired accuracy, in association with the variation of data with voltage and/or temperature. In this instance, the parameter values extracted may include one or more of To, S, and n, per Equation 1. Further, in some instances, deriving the equation may provide knowledge of multiple mathematical equations that may be used for the data fitting. The mathematical equations may be chosen or selected to yield a best possible accuracy. As described in the paragraphs below, FIG. 3 provides one instance of a method for extracting parameters.

At block 230, method 200 may generate second timing data for the integrated circuit. In some instances, the second timing data may be based on the extracted parameter values. In some other instances, the second timing data may be based on the derived equation and the extracted parameter values. Further, at block 230, method 200 may generate one or more second liberty files (.lib files) for gathering the second timing data generated for the integrated circuit in association with the extracted parameter values. As with the first liberty files, the second liberty files may be used by EDA tools to perform static timing analysis (STA) and power analysis of the integrated circuit. Further, in some instances, method 200 may generate the second timing data for the integrated circuit based on the derived equation and the extracted parameter values. In this instance, method 200 may generate one or more second liberty files (.lib files) based on or in association with the derived equation and the extracted parameter values.

In some implementations, once fitting parameters have been extracted (e.g., in block 220), new liberty files (i.e., the second liberty files (.lib files)) for one or more other voltage variations (values) and/or temperature variation (values) may be generated using the one or more derived mathematical fitting equations in association with the extracted parameter values (e.g., To, S, and/or n, per Equation 1). In some instances, this liberty file generation may be achieved without having to run additional simulations (e.g., SPICE simulations) for the integrated circuit. As described herein, FIG. 4 provides one instance of a method for generating new (or second) liberty files (.lib files).

Figure 3:
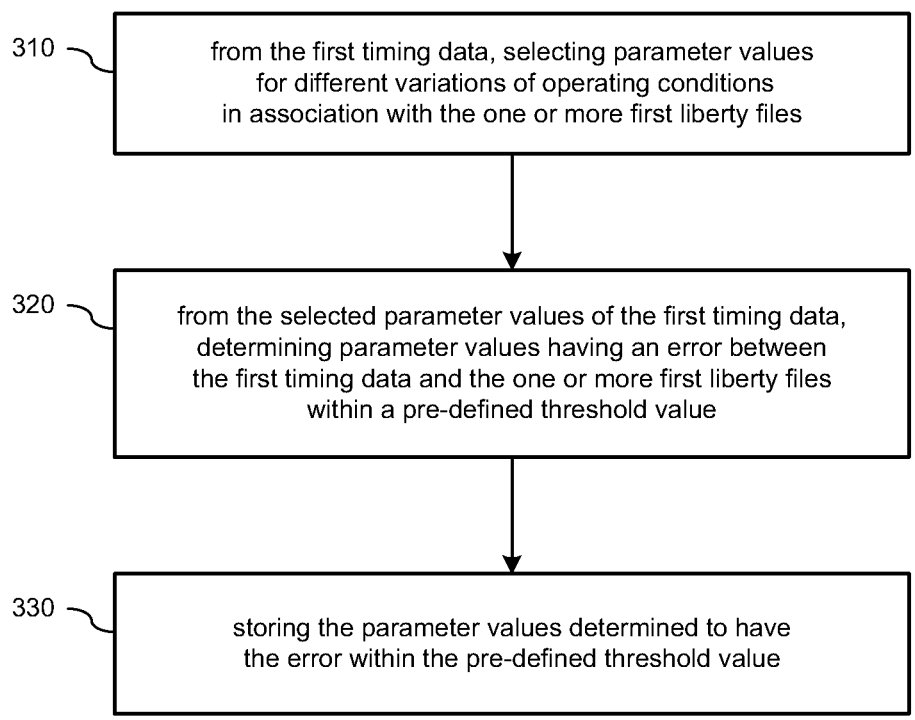

FIG. 3 illustrates a block diagram of a method 300 for extracting parameters in accordance with various implementations described herein. It should be understood that while method 300 indicates a particular order of execution of operations, in some instances, certain portions of the operations may be executed in a different order, and on different systems. Further, in some instances, the computing device 100 of FIG. 1 may be configured to perform method 300. In other instances, additional operations or steps may be added to method 300. Similarly, some operations or steps may be omitted.

In some implementations, method 300 may provide for extracting parameters, e.g., from the first timing data. For instance, at block 310, from (or using) the first timing data, method 300 may select one or more parameter values for different variations of operating conditions in association with the one or more first liberty files. At block 320, from (or using) the selected parameter values of the first timing data, method 300 may determine parameter values having an error between the first timing data and the one or more first liberty files within a pre-defined threshold value. Further, at block 330, method 300 may store the parameter values determined to have the error within the pre-defined threshold value. In some instances, the error may be a lowest degree of error.

In some implementations, method 300 may be implemented as a program or software instruction process configured for parameter extraction. For instance, method 300 may be configured to provide the following sequence of events. For each cell and each data, method 300 may select parameter value(s) for different voltage variations (or values) and/or different temperature variations (or values) in different liberty files (.lib files). These liberty files (.lib files) may be associated with one or more simulations (e.g., SPICE simulations) of the integrated circuit. Further, method 300 may select (or find or determine) one or more parameters values having a reduced degree of error between simulation data (e.g., SPICE data) and model data (i.e., data related to or obtained from the derived equation). Still further, method 300 may store the parameter values, e.g., if the error is at least less than a pre-defined value or pre-defined threshold value. In some instances, the pre-defined threshold value may be provided as an input variable to the method 300 or a program implemented for method 300.

Figure 4:
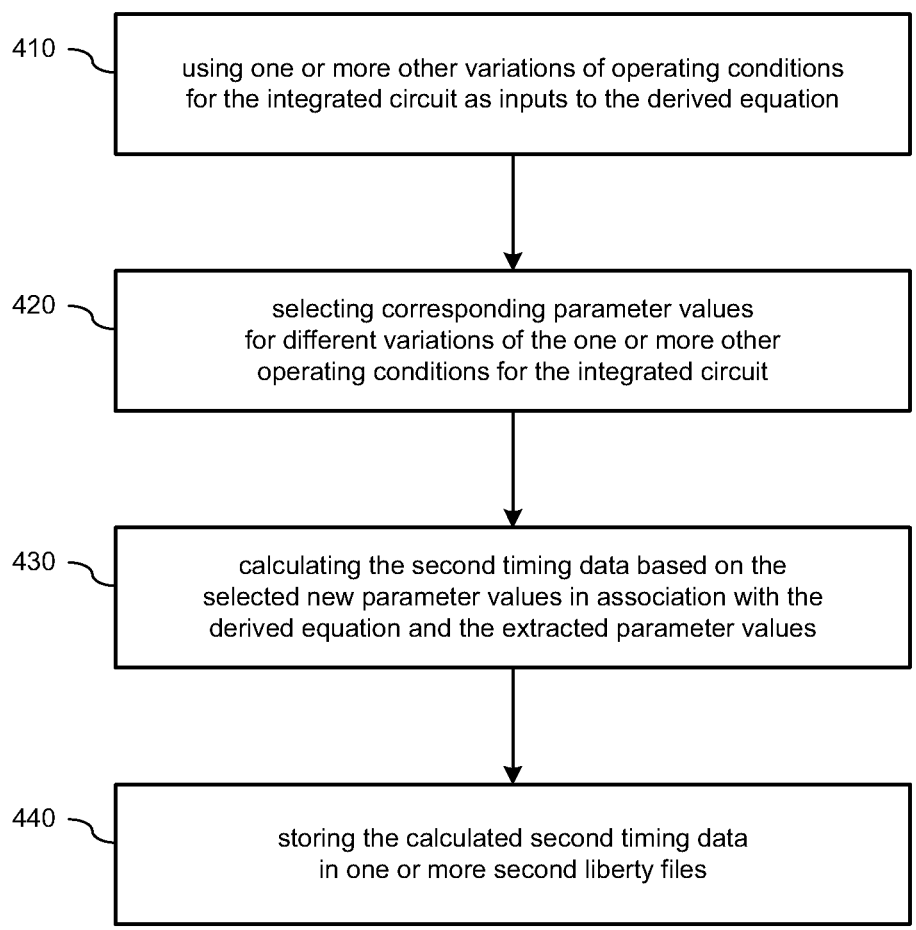

FIG. 4 illustrates a block diagram of a method 400 for generating liberty files in accordance with various implementations described herein. It should be understood that while method 400 indicates a particular order of execution of operations, in some instances, certain portions of the operations may be executed in a different order, and on different systems. Further, in some instances, the computing device 100 of FIG. 1 may be configured to perform method 400. In other instances, additional operations or steps may be added to method 400. Similarly, some operations or steps may be omitted.

In some implementations, method 400 provides for generating new (or second) liberty files (.lib files). For instance, at block 410, method 400 may use one or more other variations of operating conditions for the integrated circuit as inputs to the model (i.e., the derived equation). At block 420, method 400 may select corresponding parameter values for one or more other variations (e.g., different variations) of operating conditions for the integrated circuit. Further, at block 430, method 400 may calculate the second timing data based on the selected corresponding parameter values in association with the derived equation and the extracted parameter values. In some instances, at block 440, method 400 may store the calculated second timing data in one or more second liberty files (.lib files).

In some implementations, method 400 may be implemented as a program or software instruction process configured for liberty file generation. For instance, method 400 may be configured to provide the following sequence of events. Initially, method 400 may use voltage and temperature as inputs to the program. For each cell and each data, method 400 may select (or find or determine) corresponding model parameter values (i.e., parameter values related to or obtained from the derived equation) and calculate new data (i.e., the second timing data). Further, method 400 may store the new data (i.e., the second timing data) in one or more new (or second) liberty files (.lib files). In cases where the error obtained during method 300 is substantially high for some cells of the integrated circuit (e.g., when parameters have not been stored), the model (or derived equation) may not be used, and the corresponding liberty (.lib) data may be obtained from one or more simulations (e.g., running SPICE simulation) for the integrated circuit.

The various implementations described herein provide some advantages. For instance, one example may include a scenario of generating 16 liberty files (.lib files) for different voltage and temperature values at one process corner of an integrated circuit. In this scenario, generation of one .lib file may use 1000 hours of computing resources, where generating 16 .lib files may thus use 16000 hours of computing resources, with the same number of computing resources. With various implementations described herein, using 8 .lib files (e.g., half of 16 .lib files) to extract the data parameter values may use 8000 hours of computing resources. The 8 remaining .lib files may be generated from the mathematical fitting models (or equations) in approximately 1 hour using the computing resources. Therefore, computing resource time may be reduced by approximately 2× (two times) or a factor of 2 in this example scenario.

Once the parameter values have been extracted, one or more or any .lib file may be generated for the same process corner. This provides the ability to generate additional .lib quasi almost immediately with little or no significant use of computing resources. The mathematical fitting equation may be used as a validation tool to check consistency of existing .lib files generated from simulations (e.g., SPICE simulations) at different voltages and temperatures. For instance, during parameter extraction, a significant (or large) error may indicate an anomalous variation with voltage and/or temperature, thus possibly detecting a characterization failure (e.g., incorrect simulation result). The methodology may be extended in a second step to process variation. The difficulty may reside in finding mathematical equation(s) to fit process variation with a significant accuracy.

Described herein are various implementations of a method for generating timing data for an integrated circuit. In one implementation, the method may include generating first timing data for the integrated circuit, and the first timing data may be related to one or more variations of operating conditions for the integrated circuit. Further, the method may include extracting parameter values from the first timing data in association with the one or more variations of operating conditions. Further, the method may include generating second timing data for the integrated circuit, and the second timing data may be based on the extracted parameter values.

Described herein are various implementations of a non-transitory computer-readable medium having stored thereon a plurality of computer-executable instructions which, when executed by a computer, cause the computer to generate one or more liberty files for an integrated circuit. In one implementation, first liberty files may be generated for the integrated circuit, and the first liberty files may have first data related to first variations of operating conditions for the integrated circuit. Further, parameter values may be extracted from the first data of the first liberty files in association with the first variations of operating conditions for the integrated circuit. Further, second liberty files may be generated for the integrated circuit, and the second liberty files may have second data that is generated based on the extracted parameter values.

Described herein are various implementations of a system for generating liberty files for an integrated circuit. In one implementation, the system may include a processor and memory having stored thereon instructions that, when executed by the processor, cause the processor to generate one or more liberty files for the integrated circuit. For instance, a plurality of first liberty files may be generated for the integrated circuit, and the plurality of first liberty files may include first data related to first variations of voltage and temperature for the integrated circuit. Further, a fitting equation may be derived that may characterize the first data from the plurality of first liberty files generated for the integrated circuit in association with the first variations of voltage and temperature. Further, one or more parameter values may be extracted from the first data of the plurality of first liberty files based on the derived fitting equation and in association with the first variations of voltage and temperature for the integrated circuit. Further, one or more second liberty files may be generated for the integrated circuit, and the one or more second liberty files may include second data that may be generated based on the derived fitting equation and the extracted parameter values.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of performing static timing analysis (STA) and power analysis of an integrated circuit, comprising:
   generating first timing data for the integrated circuit, wherein the first timing data is related to one or more variations of operating conditions for the integrated circuit, wherein the first timing data includes circuit path delay data for circuit components of the integrated circuit and circuit power data for circuit components of the integrated circuit, and wherein the circuit components include transistors of different types;
   characterizing the first timing data generated for the integrated circuit in association with the one or more variations of operating conditions;
   extracting parameter values from the first timing data based on the characterized first timing data and in association with the one or more variations of operating conditions;
   generating second timing data for the integrated circuit, wherein the second timing data is based on the characterized first timing data and the extracted parameter values; and
   storing the second timing data in memory, wherein the second timing data is used for performing static timing analysis (STA) and power analysis of the integrated circuit.

2. The method of claim 1, wherein the one or more variations of operating conditions comprise one or more of voltage variations and temperature variations.

3. The method of claim 1, wherein the first timing data is generated based on one or more simulations of the integrated circuit for a range of variations of operating conditions including a range of voltage variations and temperature variations.

4. The method of claim 1, further comprising generating one or more first liberty files for gathering the first timing data generated for the integrated circuit in association with the one or more variations of operating conditions, wherein the first liberty files are used by electronic design automation (EDA) tools to perform static timing analysis (STA) and power analysis of the integrated circuit.

5. The method of claim 4, wherein extracting the parameter values from the first timing data in association with the one or more variations of operating conditions comprises:
from the first timing data, selecting parameter values for different variations of operating conditions in association with the one or more first liberty files;
from the selected parameter values of the first timing data, determining parameter values having an error between the first timing data and the one or more first liberty files within a pre-defined threshold value; and
storing the parameter values determined to have the error within the pre-defined threshold value.

6. The method of claim 1, further comprising generating one or more second liberty files for gathering the second timing data generated for the integrated circuit in association with the extracted parameter values, wherein the second liberty files are used by electronic design automation (EDA) tools to perform static timing analysis (STA) and power analysis of the integrated circuit.

7. The method of claim 1, further comprising generating one or more second liberty files for gathering the second timing data generated for the integrated circuit in association with the characterized first timing data and the extracted parameter values, wherein the second liberty files are used by electronic design automation (EDA) tools to perform static timing analysis (STA) and power analysis of the integrated circuit.

8. The method of claim 1, wherein generating the second timing data for the integrated circuit comprises:
using one or more other variations of operating conditions for the integrated circuit as inputs to the characterized first timing data;
selecting corresponding parameter values for the one or more other variations of operating conditions for the integrated circuit;
calculating the second timing data based on the selected corresponding parameter values in association with the characterized first timing data and the extracted parameter values; and
storing the calculated second timing data in one or more second liberty files.

9. The method of claim 1, wherein the characterized first timing data is derived with a mathematical empirical model that characterizes the first timing data as:

$$Td = To + \frac{S}{V^n}$$

wherein Td refers to delay, V refers to voltage, and To, S and n are constants that refer to fitting parameters selected from the first timing data.

10. A non-transitory computer-readable medium having stored thereon a plurality of computer-executable instructions which, when executed by a computer, cause the computer to:
generate first liberty files for an integrated circuit, wherein the first liberty files have first data related to first variations of operating conditions for the integrated circuit, and wherein the first data includes circuit path delay data for circuit components of the integrated circuit and circuit power data for circuit components of the integrated circuit, and wherein the circuit components include transistors of different types;
characterizing the first data from the first liberty files generated for the integrated circuit in association with the first variations of operating conditions;
extract parameter values from the first data of the first liberty files based on the characterized first data and in association with the first variations of operating conditions for the integrated circuit;
generate second liberty files for the integrated circuit, wherein the second liberty files have second data that is generated based on the characterized first data and the extracted parameter values; and
store the second data in memory, wherein the second data is used for performing static timing analysis (STA) and power analysis of the integrated circuit.

11. The computer-readable medium of claim 10, wherein the first variations of operating conditions comprise one or more of voltage variations and temperature variations.

12. The computer-readable medium of claim 10, wherein the first liberty files are generated based on simulations of the integrated circuit for a range of variations of operating conditions including a range of voltage variations and temperature variations.

13. The computer-readable medium of claim 10, wherein the instructions to generate the second liberty files for the integrated circuit comprises instructions to:
use second variations of operating conditions for the integrated circuit as inputs to the characterized first data;
select corresponding parameter values for the second variations of operating conditions for the integrated circuit;
calculate the second data for the second liberty files based on the selected corresponding parameter values in association with the characterized first data and the extracted parameter values; and
store the calculated second data in the one or more second liberty files.

14. The computer-readable medium of claim 10, wherein the first and second liberty files are used by electronic design automation (EDA) tools to perform static timing analysis (STA) and power analysis of the integrated circuit.

15. The computer-readable medium of claim 10, wherein the characterized first data is derived with a mathematical empirical model that characterizes the first data as:

$$Td = To + \frac{S}{V^n}$$

wherein Td refers to delay, V refers to voltage, and To, S and n are constants that refer to fitting parameters selected from the first timing data.

16. A system for performing static timing analysis (STA) and power analysis of an integrated circuit, comprising:
a processor; and
memory having stored thereon instructions that, when executed by the processor, cause the processor to:

generate a plurality of first liberty files for the integrated circuit, wherein the plurality of first liberty files comprise first data related to first variations of voltage and temperature for the integrated circuit, wherein the first data includes circuit path delay data for circuit components of the integrated circuit and circuit power data for circuit components of the integrated circuit, and wherein the circuit components include transistors of different types;

characterizes the first data from the plurality of first liberty files generated for the integrated circuit in association with the first variations of voltage and temperature;

extract parameter values from the first data of the plurality of first liberty files based on the characterized first data and in association with the first variations of voltage and temperature for the integrated circuit;

generate one or more second liberty files for the integrated circuit, wherein the one or more second liberty files comprise second data that is generated based on the characterized first data and the extracted parameter values; and store the second data in memory, wherein the second data is used for performing static timing analysis (STA) and power analysis of the integrated circuit.

17. The system of claim 16, wherein the first liberty files are generated based on one or more simulations of the integrated circuit for a range of variations of voltage and temperature.

18. The system of claim 16, wherein the instructions to generate the second liberty files for the integrated circuit comprises instructions to:
use one or more second variations of voltage and temperature for the integrated circuit as inputs to the characterized first data;
select corresponding parameter values for the one or more second variations of voltage and temperature for the integrated circuit;
calculate the second data for the second liberty files based on the selected corresponding parameter values in association with the characterized first data and the extracted parameter values; and
store the calculated second data in the one or more second liberty files.

19. The system of claim 16, wherein the first and second liberty files are used by electronic design automation (EDA) tools to perform static timing analysis (STA) and power analysis of the integrated circuit.

20. The system of claim 16, wherein the characterized first data is derived with a mathematical empirical model that characterizes the first data as:

$$Td = To + \frac{S}{V^n}$$

wherein Td refers to delay, V refers to voltage, and To, S and n are constants that refer to fitting parameters selected from the first timing data.

* * * * *